United States Patent [19]
Scarborough

[11] Patent Number: 5,571,409
[45] Date of Patent: Nov. 5, 1996

[54] AQUARIUM WATERFALL ASSEMBLY

[76] Inventor: Jerry L. Scarborough, 900 Berry La., Longview, Tex. 75603

[21] Appl. No.: 293,900

[22] Filed: Aug. 22, 1994

[51] Int. Cl.⁶ ................................................ A01K 63/04
[52] U.S. Cl. .................... 210/169; 210/248; 210/255; 210/416.2; 210/474; 119/259; 119/255; 239/20
[58] Field of Search ................. 210/169, 416.2, 210/194, 195.1, 196, 197, 247, 248, 255, 474, 475, 805; 119/259, 260, 261, 255; 239/11, 12, 17, 18, 20; D23/201

[56] References Cited

U.S. PATENT DOCUMENTS

| | | | |
|---|---|---|---|
| 919,157 | 4/1909 | Glaser | 119/255 |
| 2,674,574 | 4/1954 | Pettas | 210/169 |
| 3,057,094 | 10/1962 | Winkelman | 119/254 |
| 3,192,899 | 7/1965 | Lucey et al. | 119/214 |
| 3,390,665 | 7/1968 | Wininger | 119/254 |
| 3,591,971 | 7/1971 | Tanner | 43/56 |
| 3,994,807 | 11/1976 | Macklem | 119/261 |
| 4,285,813 | 8/1981 | Stewart et al. | 210/169 |
| 4,351,270 | 9/1982 | Sabin | 119/246 |
| 4,747,538 | 5/1988 | Dunn et al. | 119/255 |
| 4,836,142 | 6/1989 | Duback | 119/255 |
| 5,005,521 | 4/1991 | Strong | 119/257 |
| 5,097,795 | 3/1992 | Adey | 119/262 |

*Primary Examiner*—Robert J. Popovics
*Attorney, Agent, or Firm*—Wood, Herron & Evans, P.L.L.

[57] ABSTRACT

This invention is directed to an aquarium waterfall assembly which may be placed on top of a single aquarium tank and used to move water from the tank, over a decorative waterfall and back to the tank. If desired, the aquarium water also may be filtered using the assembly. The invention also is directed to an aquarium and waterfall system, a decorative cover for an aquarium water heater and a method of transporting water in an aquarium system.

8 Claims, 3 Drawing Sheets

AQUARIUM WATERFALL ASSEMBLY

BACKGROUND OF THE INVENTION

1. Field of the Invention

This invention relates to aquariums, and more particularly, to decorative assemblies for moving and filtering water from an aquarium over a decorative waterfall surface, and back to the aquarium.

2. Description of the Related Art

Aquariums are popular for several reasons. They provide a fun hobby, are educational, and are relaxing to watch. In addition, some aquariums are highly decorative forms of art. In caring for most aquariums, owners need to control the aquatic environment by filtering and aerating the water, as well as by maintaining water temperature. At the same time, owners want their aquariums to have a decorative and natural appearance. Yet, these two objectives often are inconsistent. Aquarium filtration units and heaters typically detract from an aquarium's appearance, while decorative aquarium displays do not assist in controlling the aquatic environment. For example, aquarium waterfalls are described in the art as a way of enhancing an aquarium's appearance. However, these waterfall systems do not maintain the quality of the water, and therefore, conventional heating and filtering units must still be used. Furthermore, these waterfalls have limited utility as decorative devices because of their design, as seen in the following patents.

U.S. Pat. No. 3,057,094 to Winkelman teaches a self-contained underwater waterfall in an aquarium. The self-contained system includes water and sand, as well as an air inlet. As air is pumped into the contained system, the water-sand-air mixture moves up a tube and then down the enclosed waterfall. The sand is added to the waterfall system so that one may see the waterfall flowing. Because the waterfall is underneath the water surface in the aquarium tank, one cannot hear the flow of the water. In addition, it may be difficult to see the flow of water down the spillway. Furthermore, the waterfall serves only a decorative purpose, and does not help in aerating or filtering the aquarium water.

Wininger U.S. Pat. No. 3,390,655 discloses an apparatus simulating a waterfall under water in an aquarium tank. The simulated waterfall includes an air tube, an uptake tube and an outlet tube. Air is pumped from the air tube to the uptake tube, drawing sand and water from the aquarium bottom into the uptake tube. As this sand and water reaches the top of the uptake tube, the sand-water mixture moves through the outflow tube and back into the main body of the aquarium. Because the simulated waterfall is under water, sand must be used in order to see the simulated flow. The waterfall is simulated because only the sand trickles down from the outflow tube to the base of the tank. The water exiting the outflow tube has the same density as the remainder of the water in the tank, and therefore it does not trickle or flow down the waterfall surface to the base of the tank. Also since the simulated waterfall is under water, an observer does not have the enjoyment of hearing the waterfall.

In U.S. Pat. No. 4,836,142, Duback teaches a multiple tank aquarium system in which water flows from one tank over a spillway into the top of another tank having a lower water line. The water is pumped from the tank having the lowest water line back into the tank having the highest water line. Because the flow of water takes place above the water surface of the tank having the lower water line, an observer may enjoy the sound of water rushing over the spillway. However, the system requires multiple tanks and does not include a decorative waterfall surface. In addition, although the system aerates the water, it provides no filtration.

SUMMARY OF THE INVENTION

It is desirable to have an aquarium waterfall assembly that operates essentially above the water line of a single aquarium tank. It is also desirable to have a waterfall assembly with a decorative waterfall surface, whereby water trickles down the waterfall surface before returning to the tank. It is also desirable to have a waterfall assembly that filters the water before returning the water to the aquarium, This invention is directed to an aquarium waterfall assembly including: a water inflow line adapted to receive water from an aquarium; a pump operatively connected to the water inflow line; and a waterfall surface having a top and a base, the waterfall surface top adapted to be positioned above a water line of the aquarium, the pump adapted to pump the aquarium water into and through the water inflow line to the waterfall surface top.

Preferably, the waterfall surface serves as a front face for an assembly housing, which further includes a top face, a back face and sides. The front face, top face and sides have the appearance of natural rock, thereby creating the impression of a decorative waterfall surface.

In a preferred embodiment, water moves up a plurality of inflow lines, through the pump and into a pump reservoir. Water then continues from the pump reservoir to the top of the waterfall surface through a plurality of outflow lines. The outflow lines are distributed across the top region of the waterfall surface and are operatively connected to the pump reservoir by horizontal distribution tubes.

The assembly also may include a tray at the base of the waterfall surface. The tray is disposed above the aquarium water line and is adapted to receive water from the waterfall surface and to return the water to the aquarium. Preferably, the tray includes a water-retaining lip adapted to hold a volume of the water. The water-retaining lip has a plurality of channels, such as holes or the like, which guide the water from the tray back to the aquarium.

If desired, the waterfall assembly also may include a filter or series of filters. Preferably, the assembly includes filters at the entry to the water inflow line, within the pump housing, and on the tray.

Additionally, the assembly includes a light source adapted to direct light onto the waterfall surface and into the aquarium. Preferably, the light source is a fluorescent light tube inside a housing disguised as a log. If desired, the assembly may further include a feeding tube extending from the top base of the housing down to the aquarium, which allows the user to feed the fish without having to remove a portion of the waterfall assembly from the top of the tank.

Another aspect of the invention includes an aquarium and waterfall system comprising an aquarium and the aquarium waterfall assembly discussed above. Additional aspects of the invention include a method of transporting or filtering water in an aquarium system, as well as a decorative cover for an aquarium water heater.

An advantage of the inventive aquarium waterfall assembly is the ability to provide a waterfall which may be used above the water line of a single aquarium. Another advantage is the ability to provide a waterfall which is not only decorative and pleasing to the observer, but also functions to aerate and filter the aquarium water. Because the waterfall is above the surface of the water, the observer hears the relaxing and pleasing trickle as the water flows down the slightly inclined waterfall surface. Furthermore, the assembly has a very pleasing natural appearance.

A further benefit is the reduction in pump noise relative to standard aquariums. Because the pump is concealed within the assembly housing, the noise generated by the pump is greatly reduced. Yet another benefit of the assembly is the reduced noise and heat from the light source. The ballast of the light is located in the waterfall housing, thereby reducing much of the heat and noise which otherwise would be generated by the light log. These and other advantages and benefits will become apparent to one of ordinary skill in the art upon reviewing the attached drawings and description of the preferred embodiment.

DESCRIPTION OF THE PREFERRED EMBODIMENT

Figure 1:
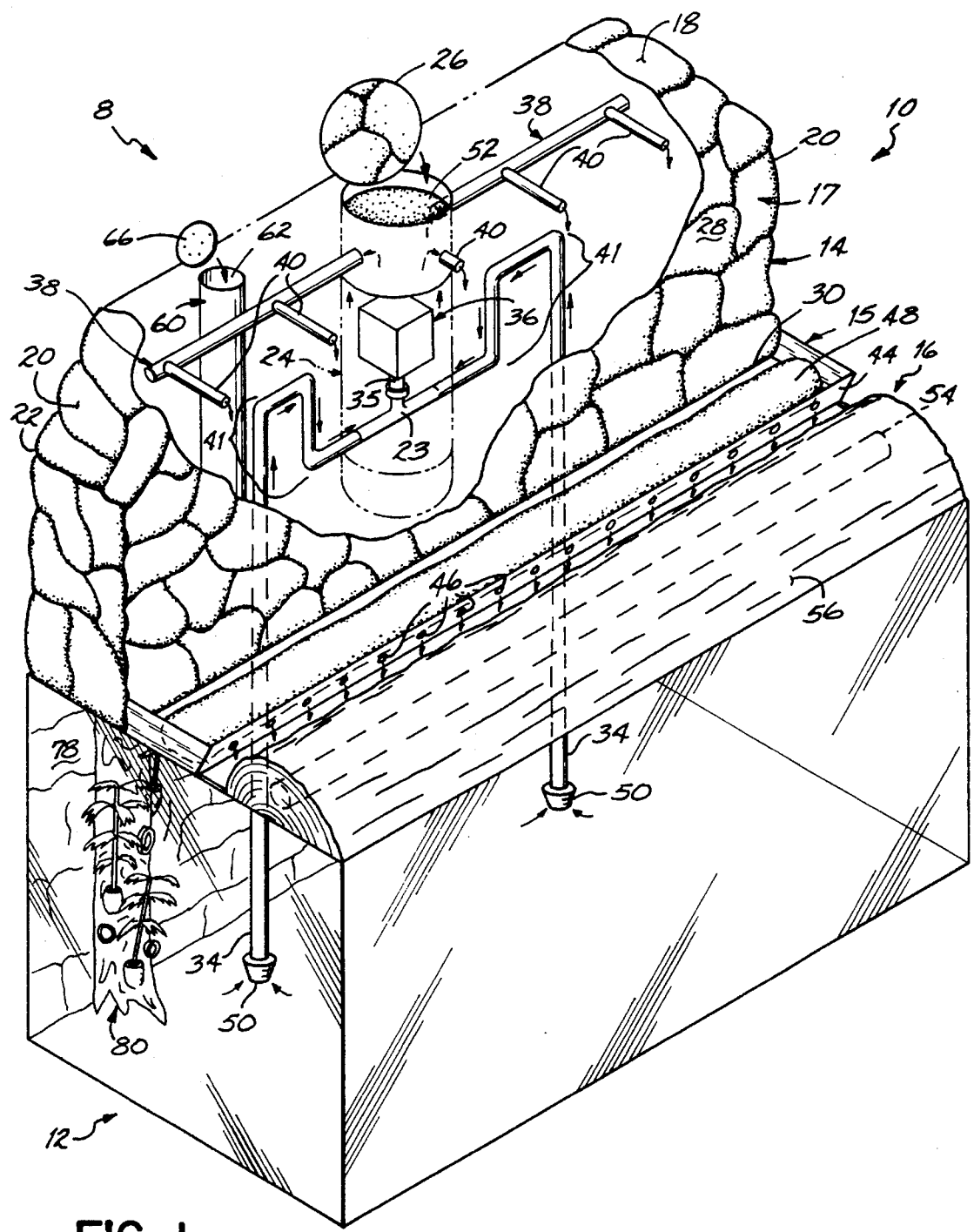
FIG. 1 is a schematic perspective view of a preferred embodiment of the inventive aquarium and waterfall system.
Figure 2:
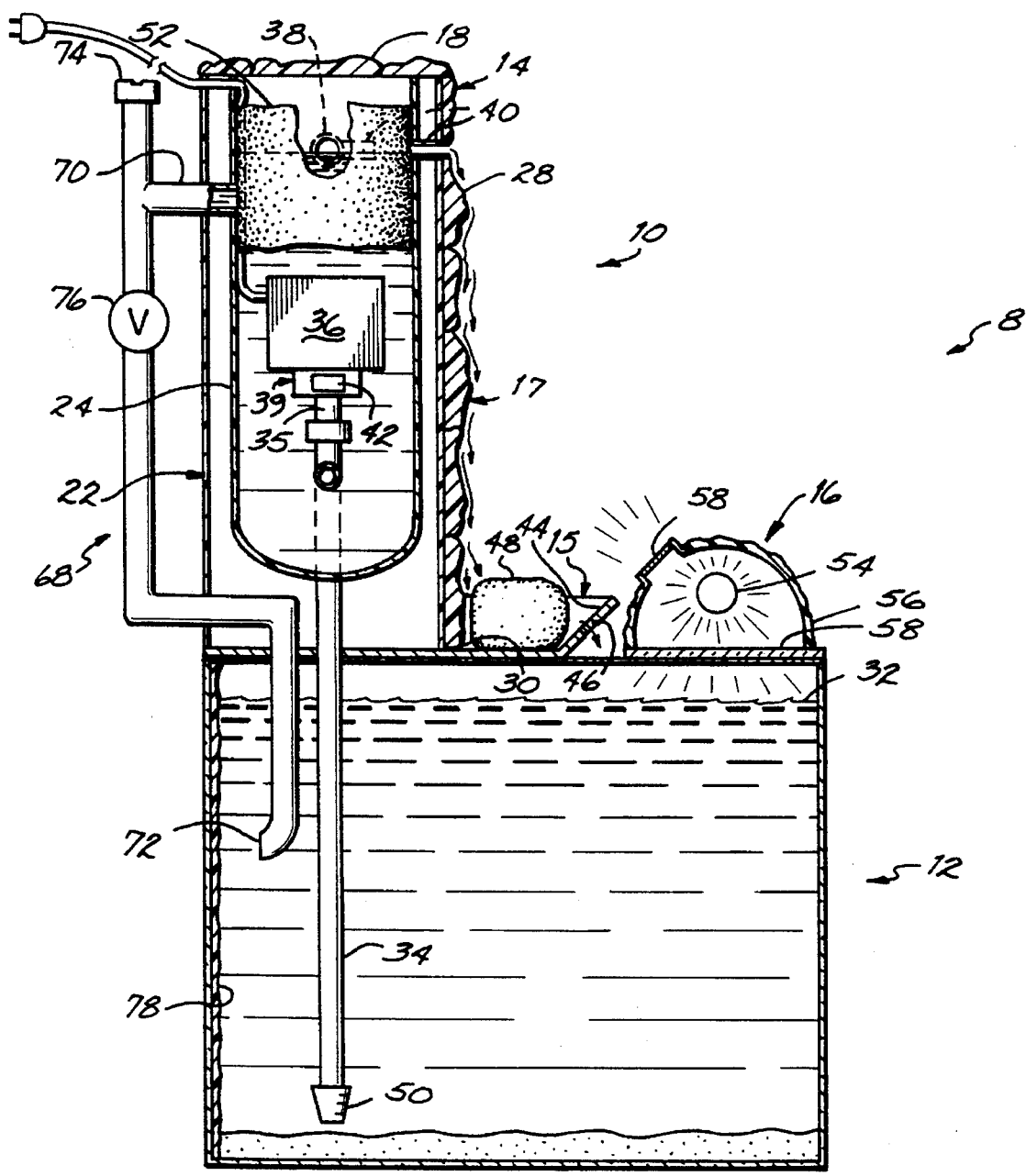
FIG. 2 is a schematic side view of a preferred embodiment of the invention shown partially in cross-section.

An aquarium and waterfall system 8 according to the principles of the invention is shown in FIGS. 1 and 2. The system 8 includes a waterfall assembly 10 resting on the upper edges of an aquarium 12. The assembly 10 includes a housing 14, a tray 15, and a light source 16. The housing 14 has a front face or waterfall surface 17, a top face 18, sides 20 and a back face 22, made preferably of a molded thermoplastic such as polyvinyl chloride. The front face 17, top face 18 and sides 20 have a decorative, rock-like appearance, thereby simulating a natural waterfall.

The housing 14 further includes two inflow lines 34 leading from the aquarium 12 to a T-joint 23 disposed within a pump reservoir 24. The T-joint 23 is connected to the intake opening 35 of a pump 36 which is located within the reservoir 24. The pump reservoir 24 has a decorative reservoir cover 26 to disguise the reservoir 24 and prevent foreign objects from being dropped into the cavity. Five water outflow lines 40 extend from the interior of the housing 14 out to the waterfall surface 17. Four of the outflow lines are connected to the pump reservoir 24 by a pair of distribution tubes 38, while the fifth and center outflow line 40 extends directly out from the pump reservoir 24. The number of inflow lines 34 and outflow lines 40 in the inventive waterfall assembly 10 may be varied as desired, usually as a function of the tank size.

If desired, the inflow lines 34 may be removed temporarily from the T-joint 23 and replaced with an aquarium cleaning device (not shown) designed specifically for use with the aquarium and waterfall system 8. The cleaning device typically is used every three to six months, and includes a flexible suction hose made of a nontoxic plastic or rubber as well as a plastic suction adapter having a narrowed opening connected to the intake end of the hose. The outtake end of the hose may be connected to either of the inflow line ports on the T-joint 23. The intake end of the hose is then positioned on its side on a particular portion of the aquarium floor, and, because the hose is sufficiently long, it may be moved occasionally to clean outlying areas of the aquarium. The cleaning device further includes a removable plug which seals the other inflow line port on the T-joint 23, thereby creating improved suction within the hose.

In the preferred embodiment shown in FIGS. 1 and 2, a standard 20 gallon tank is used. However, in a smaller tank, a simple assembly may be appropriate. The assembly might include a single inflow line leading to a pump which pumps the water out one or two outflow lines and down a waterfall surface. While in a larger tank, a more complex assembly having correspondingly more inflow and outflow lines may be desired. The waterfall assembly 10 also may be modified to accommodate tanks having non-rectangular shapes. Preferably, the inflow and outflow lines 34, 40 have a diameter of about ¼" and the distribution tubes 38 have a diameter of about ½". However, different diameters may be used to create a different flow rate over the waterfall surface 17. Also, the inflow and outflow lines 34, 40 and distribution tubes 38 preferably are made of a thermoplastic such as polyvinyl chloride.

Each of the water inflow lines 34 used in the preferred embodiment includes a dry leg 41 positioned in the inflow line 34 just before the line 34 enters the pump reservoir 24. The dry legs 41 prevent water from flowing back down the water inflow lines 34 into the aquarium 12, thereby avoiding the need for check valves within the lines 34. Additionally, the inflow lines 34 are molded so that the portion of each line extending from the housing 14 into the aquarium 12 has a natural, log-like appearance (not shown in the drawings).

The pump 36 used in the preferred embodiment is a 115 volt, single speed, submersible aquarium water pump. One preferred pump is sold by Marineland Aquarium Products of Moorpark, Calif. under the trademark Penguin Power Head Model 660. The pump is preferably modified slightly by removing the exhaust outlet (not shown) from the impeller housing 39, exposing the discharge port 42 (see FIG. 2), Removal of the exhaust outlet reduces the discharge pressure on the water exiting the pump 36, thereby enabling the pump to clear air from the inflow lines 34 more effectively when the pump 36 is started. With a more powerful submersible pump, this may not be preferable, The tray 15 of the aquarium waterfall assembly 10 is located at the base 30 of the waterfall surface 17. The tray 42 is disposed above the aquarium water line 32 and is adapted to receive water from the waterfall surface 17 and to return the water to the aquarium 12. The tray 15 includes a water-retaining lip 44 extending upward at an angle away from the waterfall surface 17, which allows the tray to hold a volume of water while gradually returning the water to the aquarium. The water-retaining lip 44 includes a plurality of channels such as holes 46 or the like which direct the flow of water back to the aquarium 12.

The preferred embodiment illustrated in FIGS. 1 and 2 includes a series of filters used to filter bacteria and other foreign matter from the aquarium water. The first filter is an inflow line filter 50 such as a plastic mesh screen placed over each of the inflow line 34 openings. The second filter is the pump reservoir filter 52 placed within the pump reservoir 24, between the pump 36 and the horizontal distribution tubes 38. The third filter is the tray filter 48 (or plurality of filters) placed in the tray 15. Both the pump reservoir filter 52 and tray filter 48 are standard filters made of activated charcoal and fibrous filter material as are readily available from aquarium and pet shops. All the filters may be rinsed out and re-used several times before replacement with new filters.

The light source 16 of the inventive waterfall assembly 10 includes a fluorescent light tube 54, a housing 56 and a ballast (not shown). The housing 56 is made of a thermoplastic such as polyvinyl chloride and is formed in the shape of a log. In addition, the housing has two openings along its longitudinal axis. One opening or slot is oriented toward the waterfall and the other opening is oriented downward into the aquarium 12, thereby allowing the attractive light log 16 to illuminate the aquarium 12 and waterfall surface 17 simultaneously. Each of these openings or slots is protected with a clear covering 58 such as a piece of glass or clear plastic.

A feeding tube 60 extends down through the waterfall housing 14 to the aquarium 12. The feeding tube 60 has a top opening 62 along the top face 18 of the housing 14, as well as a bottom opening 64 at the base of the housing 14. In addition, the tube 60 has a cover 66 to prevent objects from unintentionally being dropped down the tube 60 into the aquarium 12. The feeding tube 60 is included in this preferred embodiment so that the user has a convenient way of feeding the fish within the aquarium 12 without having to remove the housing 14 or light source 16 from the top of the aquarium 12. If desired, the housing 14 may be equipped with an automatic feeder, such as a feeder on an electric timer, instead of the feeding tube 60 shown in FIG. 1.

A waterfall bypass line 68 is used to move or filter water through the assembly 10 without having the water flow down the waterfall surface 17. The bypass line 68 includes an intake 70, an out-take 72, a vent hole 74 and a valve 76 as shown in FIG. 2. Because the intake 70 is positioned below the horizontal distribution tubes 38 and outflow lines 40 in the housing 14, water will flow from the pump reservoir 24 into the bypass line 68 and back into the aquarium 12 when the valve 76 is open, thereby bypassing the waterfall surface 17.

Figure 3:
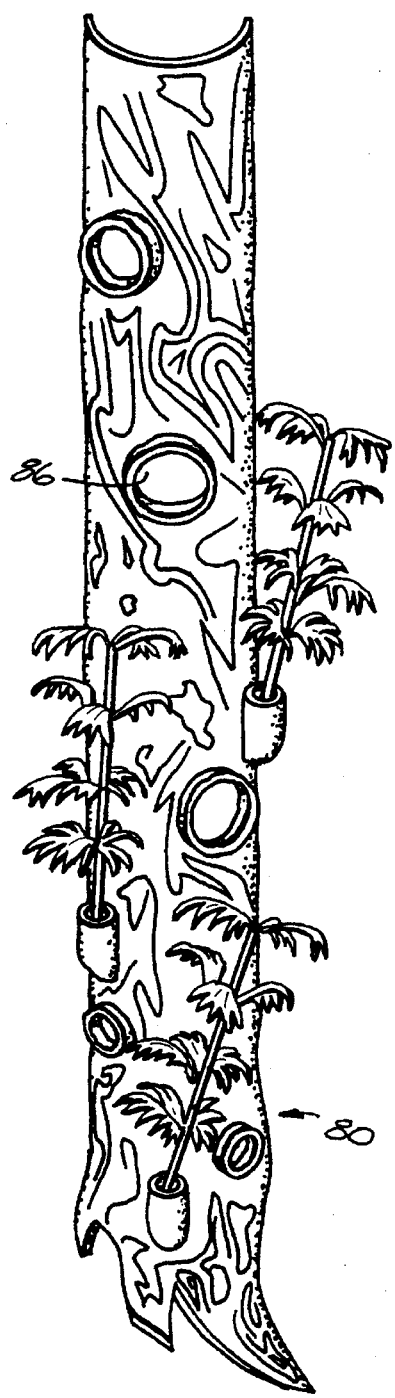
FIG. 3 is a schematic perspective view of the front of an inventive aquarium water heater cover.
Figure 4:
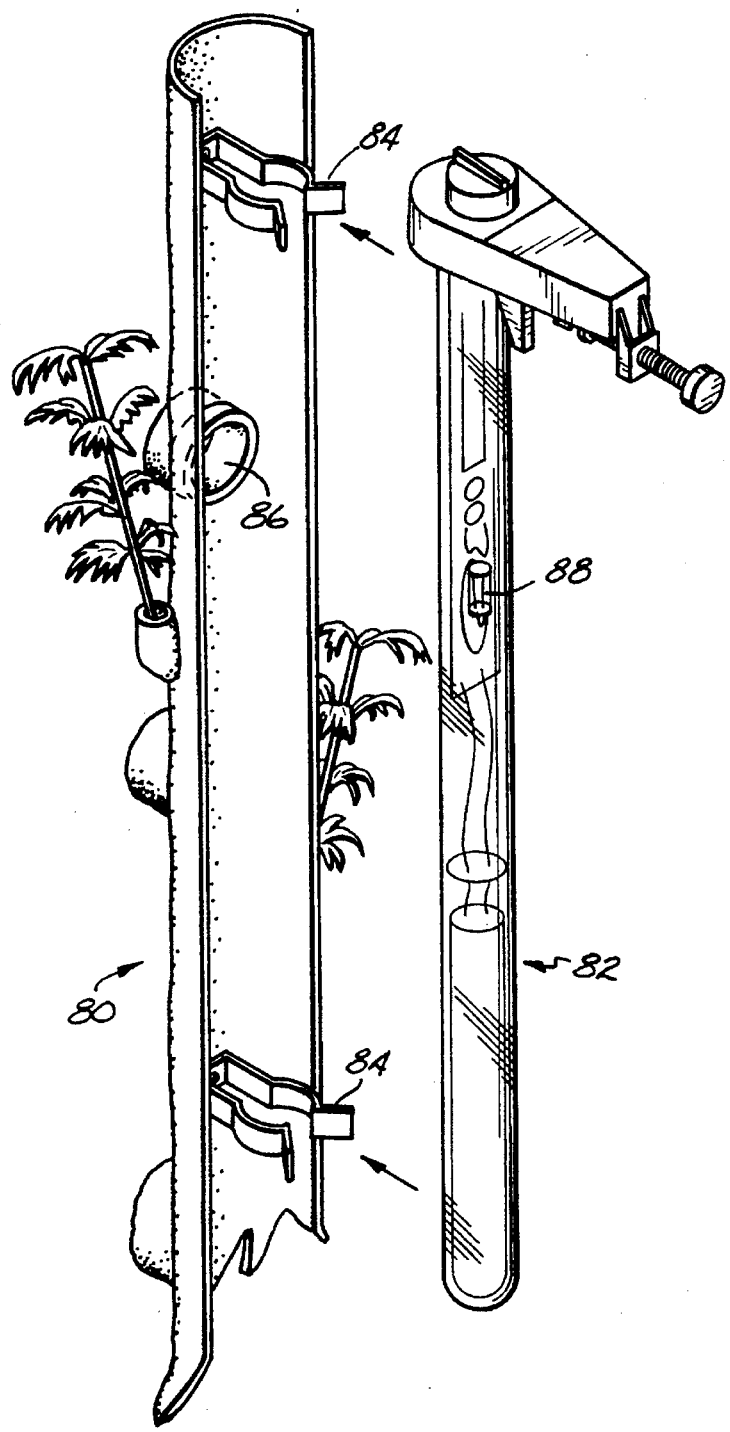
FIG. 4 is a schematic perspective view of the back side of an aquarium heater cover shown detached from a standard aquarium heater.

A heater cover 80 according to the invention is shown in FIGS. 3–5. The cover 80 is designed to provide a decorative facade for a standard aquarium water heater 82. The decorative heater cover 80 includes a pair of clasps 84 which allow the cover 80 to be securely fastened to the heater 82. In addition, the cover 80 includes a light indicator opening 86 which corresponds with the position of the light indicator 88 on the water heater 82, thereby allowing the aquarium owner to see whether or not the heater 82 is on. If desired, a decorative backdrop 78 also may be included along the back wall of the aquarium 12. In the preferred embodiment, this backdrop 78 has a natural rock formation appearance similar to that used for the waterfall surface 17. Preferably, both the heater cover 80 and backdrop 78 are made of a molded thermoplastic such as polyvinyl chloride or the like.

In operation, the aquarium waterfall assembly 10 initially is primed by removing the pump reservoir cover 26 and filling the pump reservoir 24 with water. Because each of the water inflow lines 34 includes a dry leg 41, this added water does not drain out of the inflow lines 34 back into the aquarium 12. When the priming water reaches the level of the horizontal distribution tubes 38, the operator may stop adding water and replace the pump reservoir cover 26. At this point, the pump 36 may be turned on. For the first few minutes, the pump 36 draws both water and air up through the inflow lines 34, and therefore a steady stream of water does not flow from the outflow lines 40 immediately.

After these few minutes of priming, however, water is drawn steadily up through the inflow line filters 50 and inflow lines 34, through the pump impeller housing 39, out the discharge port 42 and into the pump reservoir 24. As this additional water is pumped into the pump reservoir 24, water already in the flooded reservoir 24 moves upward, through the pump reservoir filter 52 and into the distribution tubes 38 and center outflow line 40. Within a few seconds, each horizontal distribution tube 38 is filled with water which moves out toward the waterfall surface 17 through the plurality of outflow lines 40 distributed within the upper portion of the housing 14. The water exiting the outflow lines 40 then gently trickles down the inclined waterfall surface 17 to the tray 15 under the force of gravity. Next, the water passes through the tray filter 48, through the holes 46 in the water-retaining lip 44 and back into the aquarium.

The pump 36 and diameters of the various water-carrying lines are selected to create a gentle water flow exiting the plurality of outflow lines 40. As mentioned above, other pumps and line diameters may be used, in which case the tips of the outflow lines 40 may be modified so that the openings on the outflow lines 40 are oriented downward, avoiding any potential for water to shoot out from the waterfall surface 17.

The waterfall system described in detail above provides several beneficial features. For example, the inflow lines, pump, outflow lines and waterfall surface allow water to be moved above the water line of a single aquarium tank and back into that same tank in an attractive waterfall display. Because the waterfall exists above the surface of the tank water, observers are able to both see and hear the relaxing trickle of water as it flows down the waterfall surface.

The waterfall assembly also performs the functions of an aquarium filtration unit, but in a natural and attractive way. The water is filtered three times as it passes through the assembly, and is aerated as it moves down the waterfall surface. In addition, the decorative heater cover disguises the water heater while allowing the aquarium owner to visibly determine whether or not the heater is on. Furthermore, because the pump and light ballast are concealed within the assembly housing, the waterfall is operated with relatively little noise other than the pleasant trickle of the waterfall.

Other embodiments and modifications of the invention may be made without departing from its scope as will be understood by a person of ordinary skill in the art.

What is claimed is:

1. An aquarium waterfall assembly, comprising:

a simulated waterfall structure having a waterfall surface, said simulated waterfall structure constructed and arranged to be mounted on an aquarium;

a pump reservoir containing a pump having a pump housing, an intake opening and a discharge port, said intake opening connected to an inflow line extending into said pump reservoir, said inflow line having an opening outside said pump reservoir for allowing water to be drawn through said pump and into said pump reservoir from an aquarium on which said simulated waterfall structure is mounted;

an outlet leading from said pump reservoir to said waterfall surface of said simulated waterfall structure, wherein pumping action of said pump causes water to pass from said reservoir through said outlet and over said waterfall surface; and a waterfall bypass line connected to said pump reservoir and including a valve for controlling flow of water therein, whereby when said valve is open, water from said reservoir passes through said waterfall bypass line and bypasses said outlet.

2. The assembly of claim 1 wherein said bypass line includes an intake disposed below said outlet.

3. An aquarium waterfall assembly, comprising:

a simulated waterfall structure having a waterfall surface, said simulated waterfall structure constructed and arranged to be mounted on an aquarium;

a pump reservoir containing a pump having a pump housing, an intake opening and a discharge port, said intake opening connected to an inflow line extending into said pump reservoir, said inflow line having an opening outside said pump reservoir for allowing water to be drawn through said pump and into said pump reservoir from an aquarium on which said simulated waterfall structure is mounted; and an outlet leading from said pump reservoir to said waterfall surface of said simulated waterfall structure, wherein pumping action of said pump causes water to pass from said reservoir through said outlet and over said waterfall surface, said outlet comprising a distribution tube having a plurality of outflow lines extending to said waterfall surface.

4. The assembly of claim 3 further including a second distribution tube, each of said distribution tubes extending from substantially opposite sides of said pump reservoir, said second distribution tube having a plurality of outflow lines extending to said waterfall surface.

5. An aquarium waterfall assembly, comprising:

a simulated waterfall structure having a waterfall surface, said simulated waterfall structure constructed and arranged to be mounted on an aquarium;

a pump reservoir containing a pump having a pump housing, an intake opening and a discharge port, said intake opening connected to an inflow line extending into said pump reservoir, said inflow line having an opening outside said pump reservoir for allowing water to be drawn through said pump and into said pump reservoir from an aquarium on which said simulated waterfall structure is mounted; and an outlet leading from said pump reservoir to said waterfall surface of said simulated waterfall structure, wherein pumping action of said pump causes water to pass from said reservoir through said outlet and over said waterfall surface, said simulated waterfall structure further including a tray proximate a base of said waterfall surface, said tray constructed and arranged to be disposed above a waterline of an aquarium and to receive water from said waterfall surface and return the water to an aquarium on which said simulated waterfall structure is mounted.

6. The assembly of claim 5 further including a filter disposed on said tray.

7. The assembly of claim 5 wherein said tray includes a water-retaining lip having a plurality of holes therein, whereby a volume of water may be held in said tray before passing through said holes and returning to an aquarium.

8. An aquarium waterfall assembly, comprising:

a simulated waterfall structure having a waterfall surface, said simulated waterfall structure constructed and arranged to be mounted on an aquarium;

a pump reservoir containing a pump having a pump housing, an intake opening and a discharge port, said intake opening connected to an inflow line extending into said pump reservoir, said inflow line having an opening outside said pump reservoir for allowing water to be drawn through said pump and into said pump reservoir from an aquarium On which said simulated waterfall structure is mounted; and an outlet leading from said pump reservoir to said waterfall surface of said simulated waterfall structure, wherein pumping action of said pump causes water to pass from said reservoir through said outlet and over said waterfall surface, said simulated waterfall structure further comprising a housing for containing said pump and pump reservoir, said housing having a feeding tube extending therethrough, said feeding tube having a top opening and a bottom opening, whereby fish food may be dropped through said tube into an aquarium on which said simulated waterfall structure is mounted.

* * * * *